No. 683,936. Patented Oct. 8, 1901.
G. H. HILL.
MOTOR CONSTRUCTION.
(Application filed Aug. 5, 1901.)
(No Model.)

WITNESSES:

INVENTOR
George H. Hill.
BY
ATTORNEY

UNITED STATES PATENT OFFICE.

GEORGE H. HILL, OF GLENRIDGE, NEW JERSEY, ASSIGNOR TO SPRAGUE ELECTRIC COMPANY, OF NEW YORK, N. Y.

MOTOR CONSTRUCTION.

SPECIFICATION forming part of Letters Patent No. 683,936, dated October 8, 1901.

Application filed August 5, 1901. Serial No. 70,873. (No model.)

*To all whom it may concern:*

Be it known that I, GEORGE H. HILL, a citizen of the United States, residing at Glenridge, Essex county, New Jersey, have invented certain new and useful Improvements in Motor Constructions, of which the following is a full, clear, and exact description.

My invention relates to motor construction, and particularly to a new method of attaching the field-magnets.

The object is to secure convenience, simplicity, efficiency, and economy of construction, installation, and repair.

Figure 1:
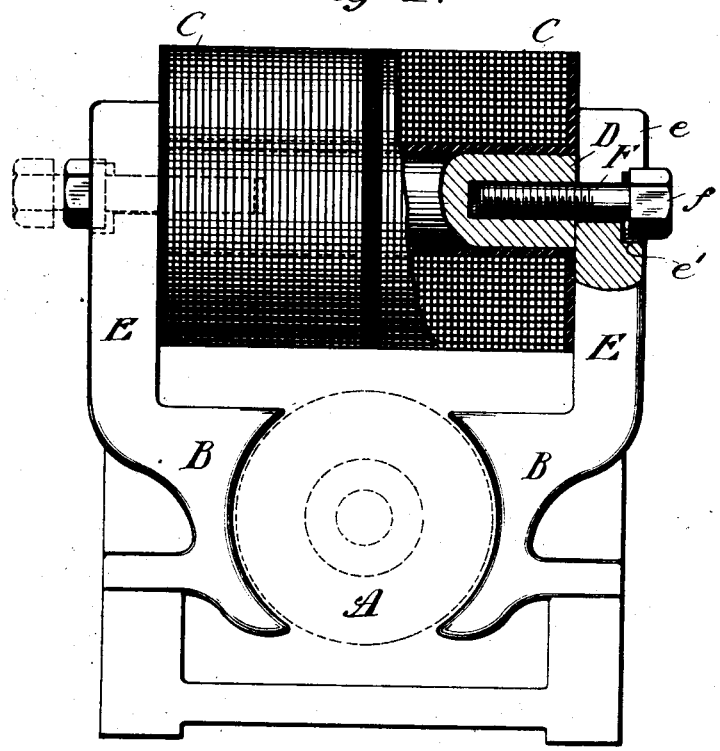
Figure 2:
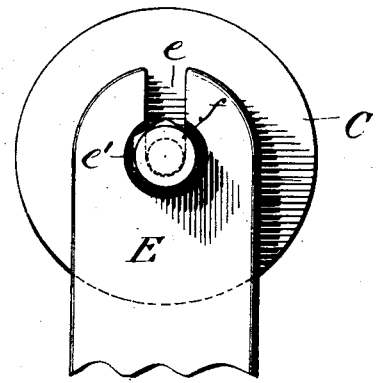

Figure 1 is a view in elevation and partly in section of one form of motor embodying my invention. Fig. 2 is an end elevation of part of the construction shown in Fig. 1.

A is a diagrammatic view of the armature.

B B are the field-magnets.

C C are the field-coils, having a core D and forming the field-magnet, which receives support from the field-magnet yokes E E by means of the bolts F F. The tops of the yokes are slotted at $e$ to a width sufficient to allow the bolts F to pass through. At $e'$ the yoke is preferably countersunk to provide a recess for the head $f$ of the bolt.

It is often desirable and many times necessary to place the motor very close to the device which it is designed to drive. With an ordinary motor in such a case and in others when there is not sufficient room to gain free access to the parts of the motor it becomes necessary in order to remove the field-magnets to take the entire motor from its base or otherwise disturb the adjacent structures. This difficulty is experienced by reason of the fact that the bolts must be entirely withdrawn before the core becomes freed. By my invention it is only necessary to unscrew the bolts just far enough for the heads to become freed from the yoke, when the entire field-magnets may be lifted out, the bolts passing freely through the slots. When the yokes are countersunk the bolts are less obstructive and are less likely to be damaged. Furthermore, the presence of the bolt-heads within the countersunk portion of the yokes insures that the field magnets shall not jump out of place should the bolts become loosened from any cause. The heads of the bolts then act as a safety device to prevent accidents.

Another and important advantage to be derived from this improved construction is that brought out when installing or replacing the field-magnets of a motor. Ordinarily the field-magnets have to be suspended and centered with great care in position between the yokes before the bolts can be started into the core, an operation requiring no little time and skill. The new method is much quicker and more simple, since the bolts are started into the core before the core is put in place. After the bolts have been started into the core the coil may be slipped into position between the yokes and the bolts tightened to secure said parts in the desired position.

What I claim is—

1. In a motor, a field-magnet, a yoke, a bolt supporting said magnet from said yoke, said yoke being slotted to receive said bolt.

2. In a motor, a field-magnet, a yoke, a bolt supporting said field-magnet from said yoke, said yoke being slotted and countersunk to receive said bolt and bolt-head.

GEORGE H. HILL.

Witnesses:
 R. C. MITCHELL,
 L. VREELAND.

Correction in Letters Patent No. 683,936.

It is hereby certified that the assignee in Letters Patent No. 683,936, granted October 8, 1901, upon the application of George H. Hill, of Glenridge, New Jersey, for an improvement in "Motor Construction," should have been described and specified as the *Sprague Electric Company, of New York, N. Y., a corporation of New Jersey*, instead of the "Sprague Electric Company, of New York, N. Y.;" and that the said Letters Patent should be read with this correction therein that the same may conform to the record of the case in the Patent Office.

Signed, countersigned, and sealed this 22d day of October, A. D., 1901.

[SEAL.]

F. L. CAMPBELL,
*Assistant Secretary of the Interior.*

Countersigned:
F. I. ALLEN,
*Commissioner of Patents.*